United States Patent
DeVeny (10) Patent No.: US 12,059,958 B2
(45) Date of Patent: Aug. 13, 2024

(54) ELECTRIC AXLE ASSEMBLY FOR LOW FLOOR VEHICLE

(71) Applicant: ALLISON TRANSMISSION, INC., Indianapolis, IN (US)

(72) Inventor: Jay DeVeny, Birmingham, MI (US)

(73) Assignee: Allison Transmission, Inc., Indianapolis, IN (US)

(*) Notice: Subject to any disclaimer, the term of this patent is extended or adjusted under 35 U.S.C. 154(b) by 338 days.

(21) Appl. No.: 17/280,685

(22) PCT Filed: Oct. 4, 2019

(86) PCT No.: PCT/US2019/054793
§ 371 (c)(1),
(2) Date: Mar. 26, 2021

(87) PCT Pub. No.: WO2020/072958
PCT Pub. Date: Apr. 9, 2020

(65) Prior Publication Data
US 2021/0379984 A1      Dec. 9, 2021

Related U.S. Application Data

(60) Provisional application No. 62/741,136, filed on Oct. 4, 2018.

(51) Int. Cl.
*B60K 7/00* (2006.01)
*B60K 1/02* (2006.01)
*B60K 11/02* (2006.01)

(52) U.S. Cl.
CPC ............. *B60K 7/0007* (2013.01); *B60K 1/02* (2013.01); *B60K 11/02* (2013.01); *B60K 2007/0053* (2013.01); *B60K 2007/0092* (2013.01)

(58) Field of Classification Search
CPC .......... B60K 7/007; B60K 1/02; B60K 11/02; B60K 2007/0053
(Continued)

(56) References Cited

U.S. PATENT DOCUMENTS 2,047,050 A    7/1936  Armington
3,862,667 A *  1/1975  Wolansky .............. B60K 17/30
                                            180/254
(Continued)

FOREIGN PATENT DOCUMENTS

CN        2738035 Y    11/2005
CN      101484328 A     7/2009
(Continued)

OTHER PUBLICATIONS

PCT Search Report and Written Opinion prepared for PCT/US2019/053648, completed Feb. 19, 2020.
(Continued)

*Primary Examiner* — Hau V Phan
(74) *Attorney, Agent, or Firm* — Barnes & Thornburg LLP (57) ABSTRACT

An electric axle assembly includes a suspension frame, a pair of drive assemblies coupled to opposite sides of the suspension frame, and a drive module coupled to the suspension frame. The drive module controls operation of the drive assemblies. The electric axle assembly is mounted to a vehicle frame and provides motive force to wheels of the vehicle for propelling the vehicle along a roadway.

11 Claims, 8 Drawing Sheets

(58) Field of Classification Search
USPC .................................................. 180/65.51
See application file for complete search history.

(56) References Cited

U.S. PATENT DOCUMENTS

| | | | |
|---|---|---|---|
| 5,762,154 A | 6/1998 | Hsu | |
| 5,947,855 A * | 9/1999 | Weiss | B60K 6/36 |
| | | | 477/3 |
| 6,964,317 B2 | 11/2005 | Groves et al. | |
| 7,048,087 B2 | 5/2006 | Brill | |
| 9,283,837 B1 | 3/2016 | Rawlinson et al. | |
| 9,302,723 B1 | 4/2016 | Pollitzer et al. | |
| 9,428,040 B2 * | 8/2016 | Shibata | B62D 25/082 |
| 9,630,482 B2 | 4/2017 | Raymond | |
| 10,029,551 B2 * | 7/2018 | Ito | H01M 10/6551 |
| 10,581,126 B2 * | 3/2020 | Milton | H01M 10/6556 |
| 10,800,254 B2 | 10/2020 | Remboski et al. | |
| 10,882,389 B2 * | 1/2021 | Kucharski | B60K 6/52 |
| 2003/0111280 A1 | 6/2003 | Platner et al. | |
| 2003/0132040 A1 | 7/2003 | Radosevich et al. | |
| 2004/0200660 A1 | 10/2004 | Szalai et al. | |
| 2004/0226761 A1 | 11/2004 | Takenaka et al. | |
| 2005/0045412 A1 * | 3/2005 | Brill | B60K 17/043 |
| | | | 180/905 |
| 2009/0251018 A1 | 10/2009 | Koshida | |
| 2012/0103708 A1 * | 5/2012 | Hennings | B60K 7/0007 |
| | | | 180/65.6 |
| 2012/0217793 A1 | 8/2012 | Drum et al. | |
| 2014/0262588 A1 * | 9/2014 | Bruns | B60K 1/00 |
| | | | 180/291 |
| 2014/0332294 A1 | 11/2014 | Soma et al. | |
| 2015/0096823 A1 * | 4/2015 | Raymond | B60K 1/02 |
| | | | 180/56 |
| 2015/0271956 A1 | 9/2015 | Sun | |
| 2016/0075224 A1 | 3/2016 | Miu et al. | |
| 2017/0122408 A1 * | 5/2017 | Chung | F16H 1/28 |
| 2017/0237379 A1 | 8/2017 | Fukazu et al. | |
| 2018/0105027 A1 * | 4/2018 | Langhoff | B60K 1/02 |
| 2019/0120357 A1 | 4/2019 | Han | |
| 2020/0180426 A1 | 6/2020 | Chopra et al. | |

FOREIGN PATENT DOCUMENTS

| | | |
|---|---|---|
| CN | 105416034 A | 3/2016 |
| CN | 205112980 U | 3/2016 |
| CN | 205686342 U | 11/2016 |
| CN | 107284214 | 10/2017 |
| CN | 107284214 A | 10/2017 |
| DE | 29800582 U1 | 4/1998 |
| EP | 1266784 | 12/2002 |
| EP | 1266784 A1 | 12/2002 |
| EP | 1503481 | 2/2005 |
| EP | 1503481 A2 | 2/2005 |
| EP | 2962884 A1 | 1/2016 |
| WO | 2019014479 A1 | 1/2019 |
| WO | 2019217861 A1 | 11/2019 |

OTHER PUBLICATIONS

International Preliminary Report on Patentability for International Application No. PCT/US2019/054793, Mar. 23, 2021, 7 pages.
United Kingdom Examination Report for Application No. GB2214758.1, Mar. 14, 2023, 2 pages.
Office Action issued in co-pending Chinese Application 201980071045.9 dated Jul. 26, 2023.
Examination Report issued in co-pending United Kingdom Application GB2104861.6 dated Mar. 30, 2022, 1 page.
Examination Report issued in co-pending United Kingdom Application GB2214758.1 dated Oct. 24, 2022, 3 pages.
Search Report issued in co-pending United Kingdom Application GB2214758.1 dated Oct. 20, 2022, 2 pages.
Search and Examination Report issued in co-pending United Kingdom Application GB2219302.3 dated Feb. 6, 2023, 1 page.
Search Report issued in co-pending United Kingdom Application GB2219302.3 dated Feb. 3, 2023, 1 page.

* cited by examiner

ELECTRIC AXLE ASSEMBLY FOR LOW FLOOR VEHICLE

CROSS-REFERENCE TO RELATED U.S. PATENT APPLICATION

This present application is the U.S. national phase of PCT/US2019/054793, filed on Oct. 4, 2019, which claims priority under 35 U.S.C. § 119(e) to U.S. Provisional Patent Application Ser. No. 62/741,136, filed on Oct. 4, 2018, the disclosures of both of which are hereby incorporated by reference in their entirety.

TECHNICAL FIELD

The present disclosure relates generally to axle assemblies for vehicles, and more particularly, to an electric axle assembly for a low floor vehicle.

BACKGROUND

In order to aid ingress and egress, it is oftentimes ideal for a vehicle to have a floor that is as low as possible. Busses and people carriers, commonly called low floor vehicles, are examples of vehicles that benefit from a low floor height. By minimizing the floor height, a step at a door of the vehicle may be eliminated, which in turn allows passengers easier ingress and egress of vehicle passengers. Furthermore, elimination of steps is especially beneficial to disabled passengers, and passengers with strollers. Increasingly, manufacturers have turned to electric and hybrid propulsion systems for low floor vehicles for increased performance and efficiency. In order to have the floor of the vehicle as low as possible, the drivetrain components are relocated so as to reduce intrusions into the vehicle floor.

Accordingly, there is a need to provide an electric axle assembly that addresses these issues.

SUMMARY

According to an aspect of the present disclosure, an electric axle assembly may include a suspension frame, a drive assembly coupled to the suspension frame, and a drive module coupled to the suspension frame. The drive assembly may include an electric drive unit and a drive train housed in a case. The electric drive unit may be engaged with the drive train and configured to provide motive force to the drive train. The drive module may be configured to control operation of the drive assembly. One or more interconnects may be coupled between the drive module and the drive assembly. The drive module may include a drive circuit and an enclosure. The drive circuit may be housed in the enclosure and the enclosure may be sealed around the drive circuit.

In illustrative embodiments, the drive circuit includes an inverter and a controller. The controller may be configured to selectively power the inverter for operation of the electric drive unit.

In illustrative embodiments, the drive circuit may include a cooling circuit.

In illustrative embodiments, the enclosure may include a side wall defining a rim, a floor, and a lid. The lid may be configured to engage with a seal member arranged on the rim to close the drive circuit in the enclosure and seal the enclosure around the drive circuit.

In illustrative embodiments, the enclosure may include sealed connectors to allow sealed connection of the interconnects to the drive module for communication with the drive circuit.

In illustrative embodiments, the one or more interconnects may be arranged for at least one of power delivery or control signal delivery.

In illustrative embodiments, at least one of the interconnects may be arranged for delivery of cooling fluid.

In illustrative embodiments, one or more interconnects may be coupled to the drive module and at least one of a battery or a vehicle controller.

In illustrative embodiments, the suspension frame may be formed to include a recess and the drive module may be received in the recess.

In illustrative embodiments, at least one isolation mount may be arranged to support the drive module relative to the suspension frame. The isolation mount may be configured to dampen forces transferred from the suspension frame to the drive module.

In illustrative embodiments, the isolation mount may include a support tab coupled to the drive module, a support tab coupled to the suspension frame, a pin arranged to align the support tabs, and a biasing member arranged between the support tabs and configured to bias the support tabs away from one another.

According to an aspect of the present disclosure, a vehicle may include a vehicle frame and an electric axle assembly coupled to the vehicle frame. The electric axle assembly may be configured to provide motive force to wheels of the vehicle. The electric axle assembly may include a suspension frame coupled to the vehicle frame, a pair of drive assemblies coupled to opposite sides of the suspension frame, and a drive module coupled to the suspension frame. Each drive assembly may include an electric drive unit and a drive train housed in a case. The electric drive unit may be engaged with the drive train and configured to provide motive force to the drive train. The drive module may be configured to control operation of the drive assemblies. One or more interconnects may be coupled between the drive module and each drive assembly. The drive module may include a drive circuit and an enclosure. The drive circuit may be housed in the enclosure and the enclosure may be sealed around the drive circuit.

In illustrative embodiments, the drive circuit may include a first inverter, a second inverter, and at least one controller. The at least one controller may be configured to selectively power the first and second inverters for operation of the electric drive units of the drive assemblies.

In illustrative embodiments, the drive circuit may include a cooling circuit.

In illustrative embodiments, the enclosure may include a side wall defining a rim, a floor, and a lid. The lid may be configured to engage with a seal member arranged on the rim to close the drive circuit in the enclosure and seal the enclosure around the drive circuit.

In illustrative embodiments, the enclosure may include sealed connectors to allow sealed connection of the interconnects to the drive module for communication with the drive circuit.

In illustrative embodiments, the one or more interconnects may be arranged for at least one of power delivery or control signal delivery.

In illustrative embodiments, at least one of the interconnects may be arranged for delivery of cooling fluid.

In illustrative embodiments, one or more interconnects may be coupled to the drive module and at least one of a battery or a vehicle controller.

In illustrative embodiments, the suspension frame may be formed to include a recess between the pair of drive assemblies and the drive module may be received in the recess.

In illustrative embodiments, at least one isolation mount may be arranged to support the drive module relative to the suspension frame. The isolation mount may be configured to dampen forces transferred from the suspension frame to the drive module.

In illustrative embodiments, the isolation mount may include a support tab coupled to the drive module, a support tab coupled to the suspension frame, a pin arranged to align the support tabs, and a biasing member arranged between the support tabs and configured to bias the support tabs away from one another.

According to an aspect of the present disclosure, a drive module for use with an electric axle assembly may include a drive circuit and an enclosure. The drive circuit may include a first inverter, a second inverter, and at least one controller. The enclosure may include a side wall defining a rim, a floor, and a lid. The lid may be configured to engage with a seal member arranged on the rim to close the drive circuit in the enclosure and seal the enclosure around the drive circuit. The controller may be configured to selectively power the first and second inverters. The drive circuit may be configured to communicate with one or more drive assemblies of the electric axle assembly via one or more interconnects for the delivery of power and/or control signals to the drive assemblies.

In illustrative embodiments, the drive circuit may include a cooling circuit.

In illustrative embodiments, the enclosure may include sealed connectors to allow sealed connection of the interconnects to the drive module for communication with the drive circuit.

BRIEF DESCRIPTION OF THE DRAWINGS

The systems and methods described herein are illustrated by way of example and not by way of limitation in the accompanying figures (abbreviated as "Fig." or "Figs." herein). For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
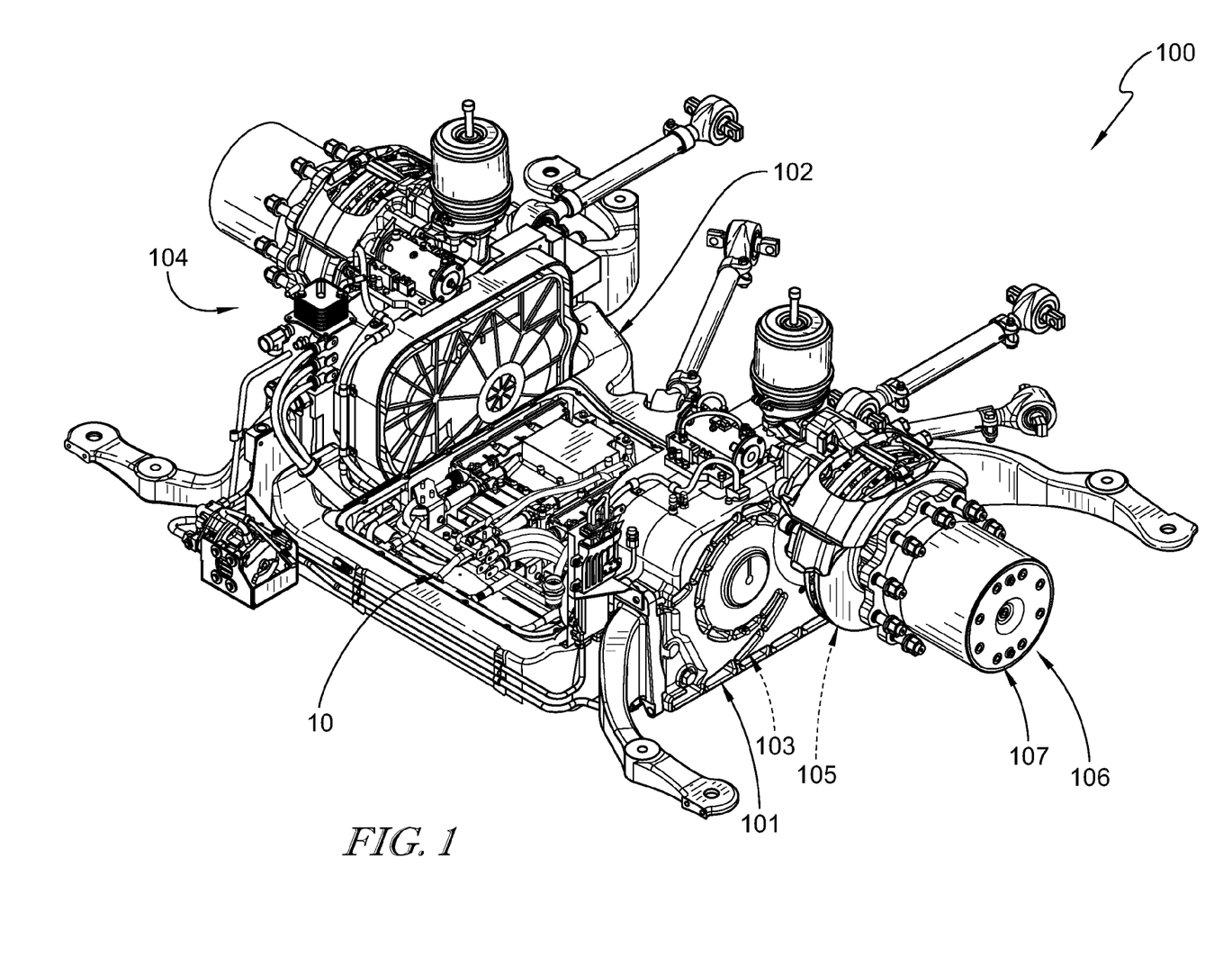
FIG. 1 is a perspective view of an electric axle assembly for a low floor vehicle according to the present disclosure.
Figures 2, 3, 4:
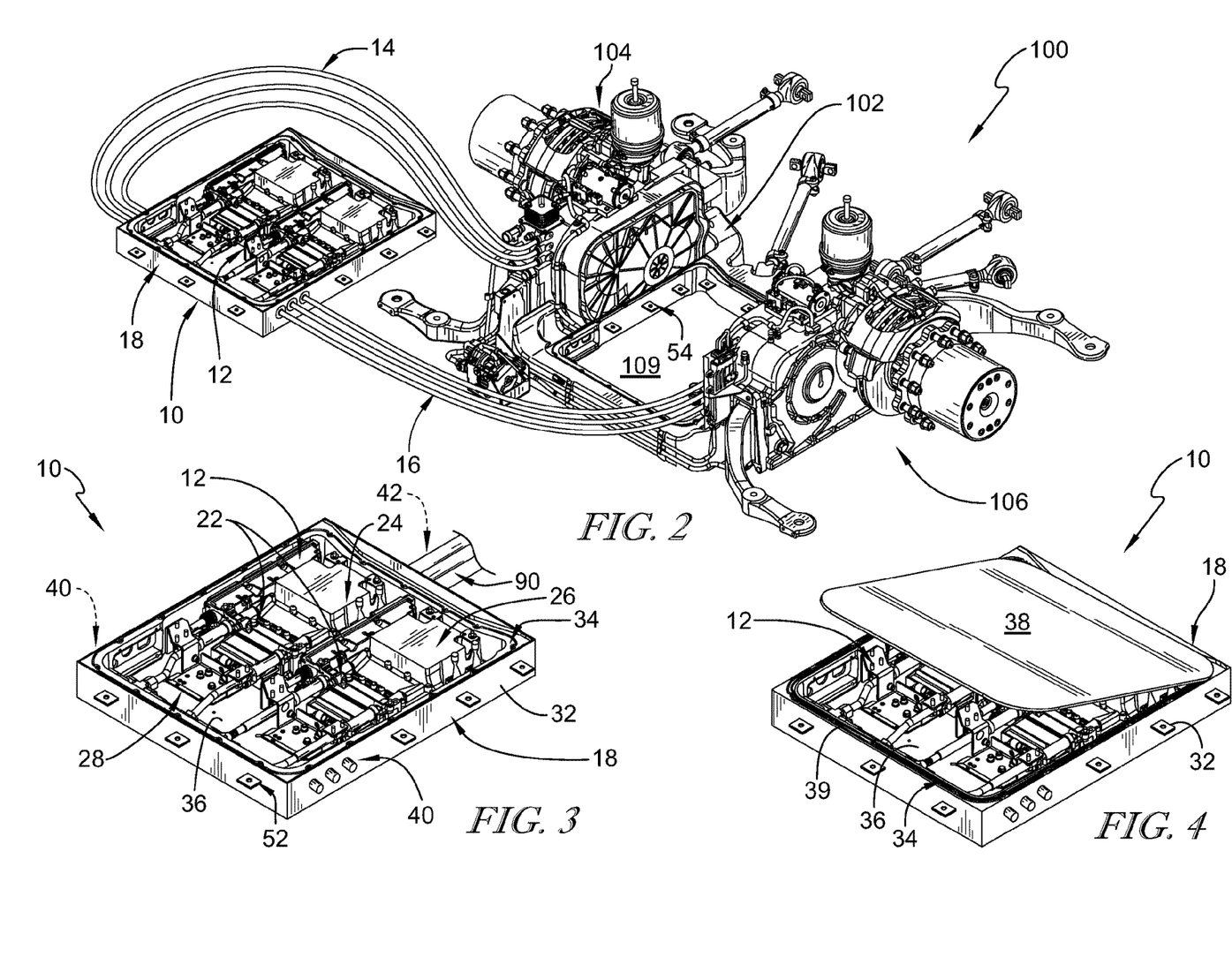
FIG. 2 is a similar view to FIG. 1 showing a drive module displaced from a suspension frame.
FIG. 3 is a perspective view of the drive module of FIG. 2.
FIG. 4 is a view similar to FIG. 3.
Figure 5:
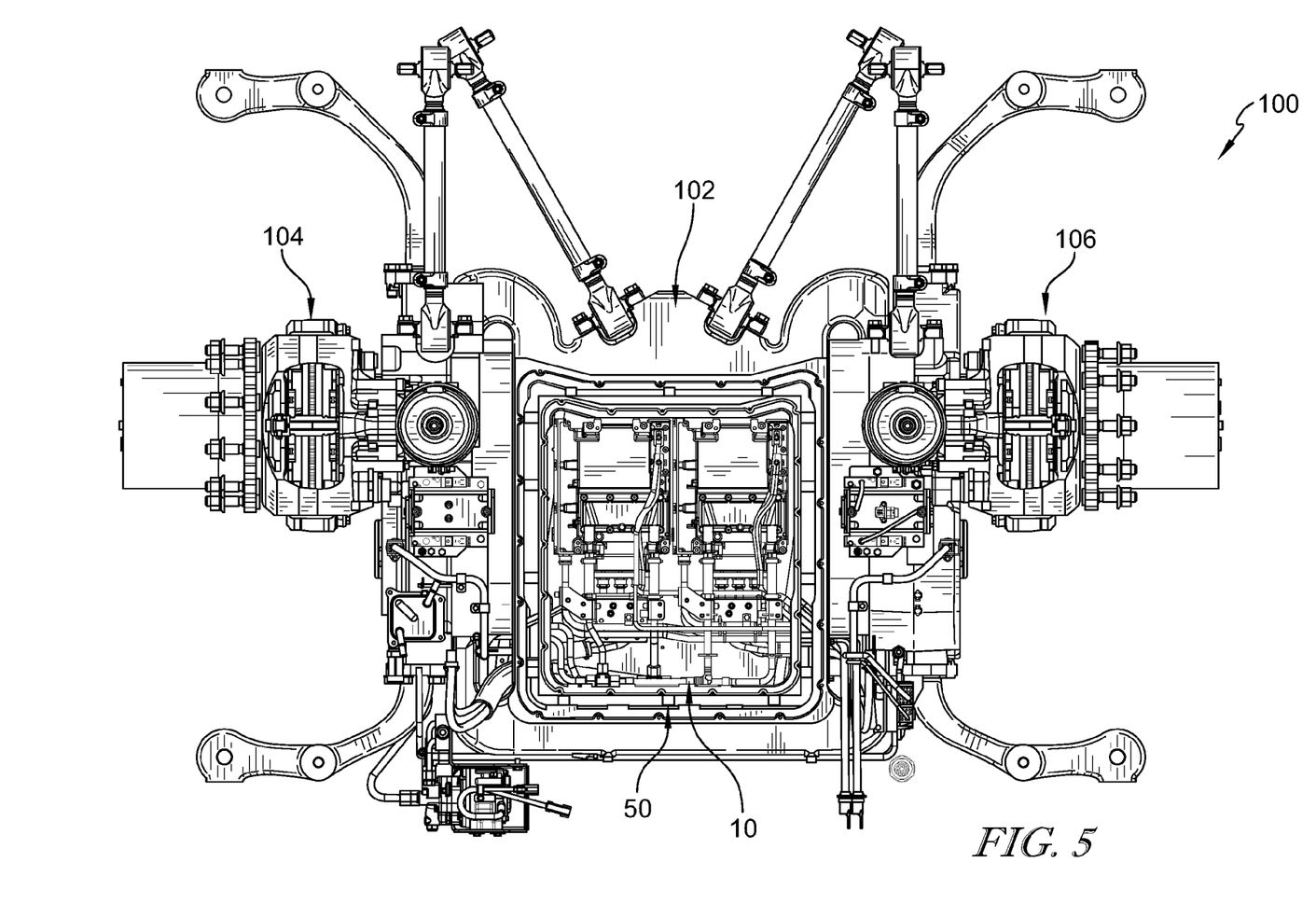
FIG. 5 is a top plan view of the electric axle assembly of FIG. 1.
Figure 13:
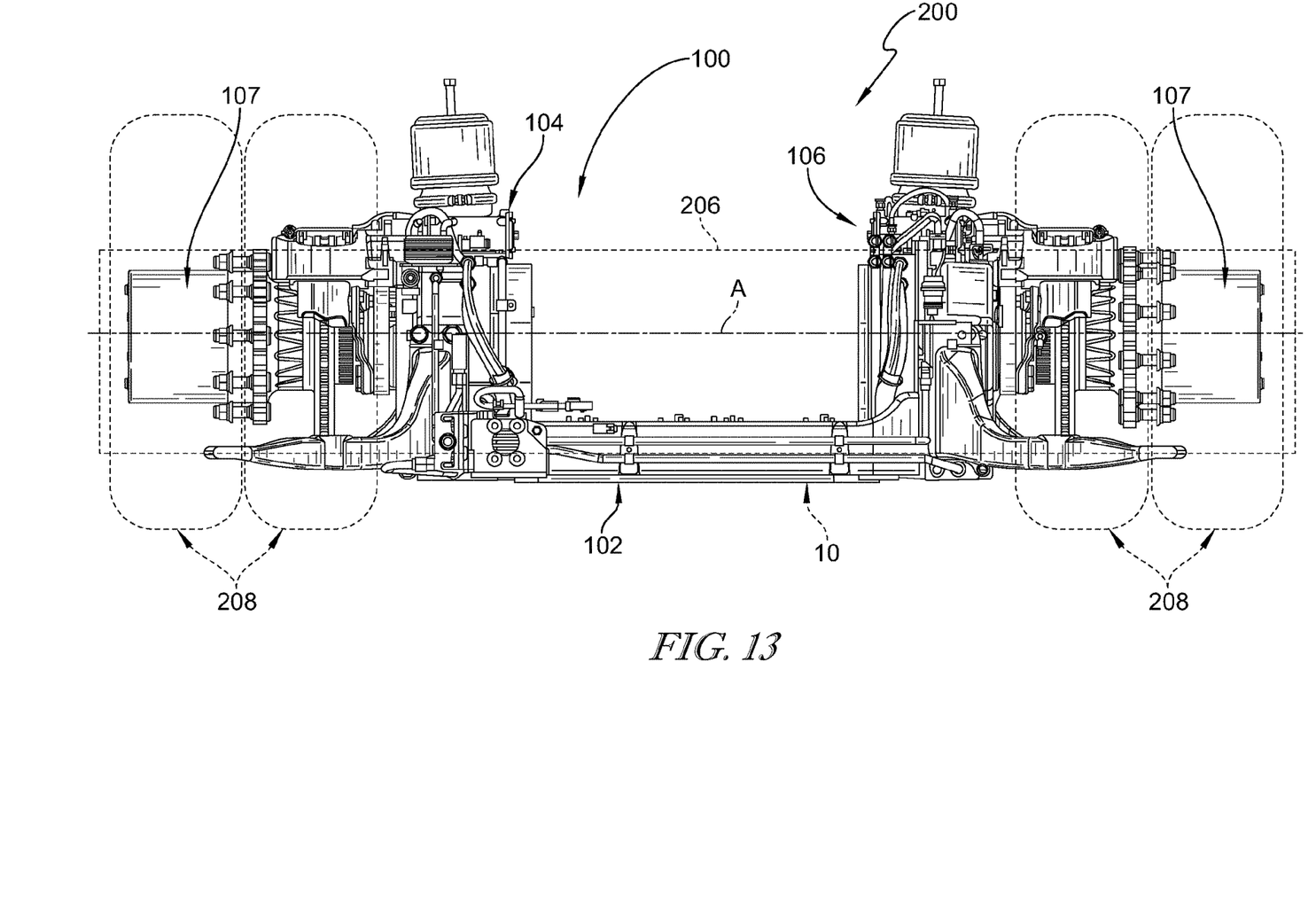
FIG. 13 is a front elevation view of the vehicle.

An illustrative electric axle assembly 100 in accordance with the present disclosure is shown in FIGS. 1 and 2. The electric axle assembly 100 can be used, for example, in a low floor vehicle 200 (FIG. 13), such as a bus, to support the vehicle 200 for travel over the ground and propel the vehicle 200. The electric axle assembly 100 includes a suspension frame 102 and a pair of drive assemblies 104, 106 coupled to opposing sides of the suspension frame 102 as shown in FIG. 1. The suspension frame 102 attaches to a vehicle frame 206 (FIG. 13) for supporting the drive assemblies 104, 106 relative to the vehicle frame 206.

Figure 14:
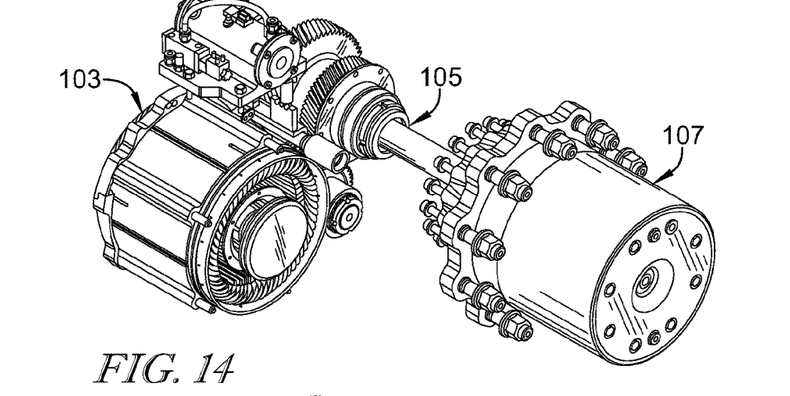
FIGS. 14-16 are perspective views of a drive unit and drive train in accordance with the present disclosure.
Figure 15:
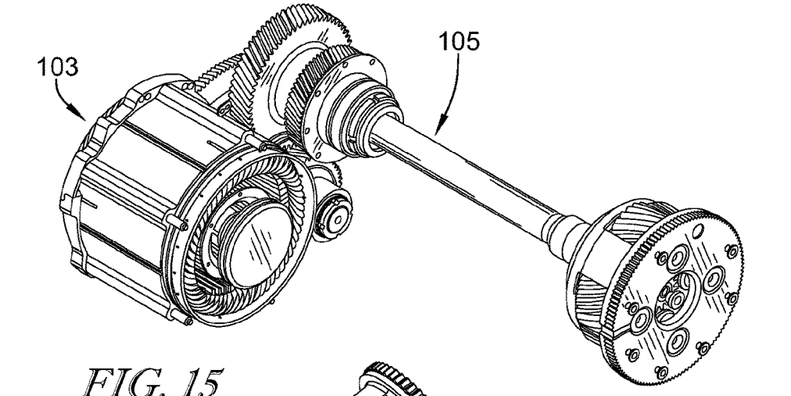
Figure 16:
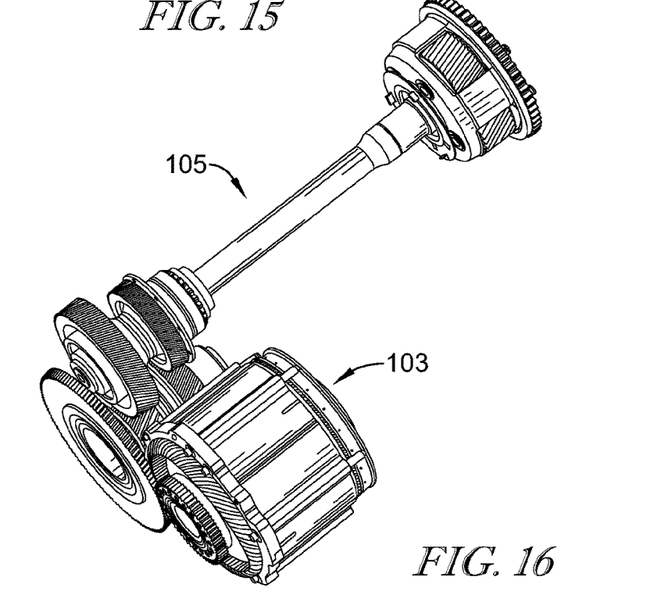

Each of the drive assemblies 104, 106 includes a drive unit 103, such as an electric motor, and a drive train 105 as shown in FIG. 1. The drive units 103 and drive trains 105 are housed in cases 101 of the drive assemblies 104, 106. Wheel hubs 107 allow attachment of wheels 208 to the drive assemblies 104, 106 for rotation about an axis A with rotation of the drive trains 105 as suggested in FIG. 13. The drive units 103 provide motive force to the wheels 208 through the drive trains 105 for propelling the vehicle 200 along the ground. An exemplary drive unit 103 and drive train 105 are shown in FIGS. 14-16. Examples of axle assemblies for low floor vehicles are shown in International Patent Application Publication No. WO2019/014479 and International Patent Application No. PCT/US2019/031786, the disclosures of which are both incorporated by reference herein in their entireties.

A drive module 10 in accordance with the present disclosure controls operation of the electric axle assembly 100 as shown in FIGS. 1-4. In the illustrative embodiment, the drive module 10 includes a drive circuit 12 housed in an enclosure 18. One or more interconnects 14, 16 are coupled to each of the drive assemblies 104, 106, respectively. The drive module 10 is received in a recess 109 of the suspension frame 102.

The drive circuit 12 includes one or more controllers 22 and inverters 24, 26 as shown in FIG. 3. In some embodiments, a controller 22 is provided for each inverter 24, 26. In the illustrative embodiment, the inverter 24 selectively powers the drive unit 103 in the drive assembly 104 through the interconnects 14, and the inverter 26 selectively powers the drive unit 103 in the drive assembly 106 through the interconnects 16. In some embodiments, a cooling circuit 28 is arranged in the enclosure 18 and configured to cool the drive circuit 12. Other interconnects 14, 16 are contemplated by the present disclosure, such as interconnects for control signals, cooling fluid, sensors and other feedback mechanisms, and other beneficial interconnects.

Figures 10, 11:
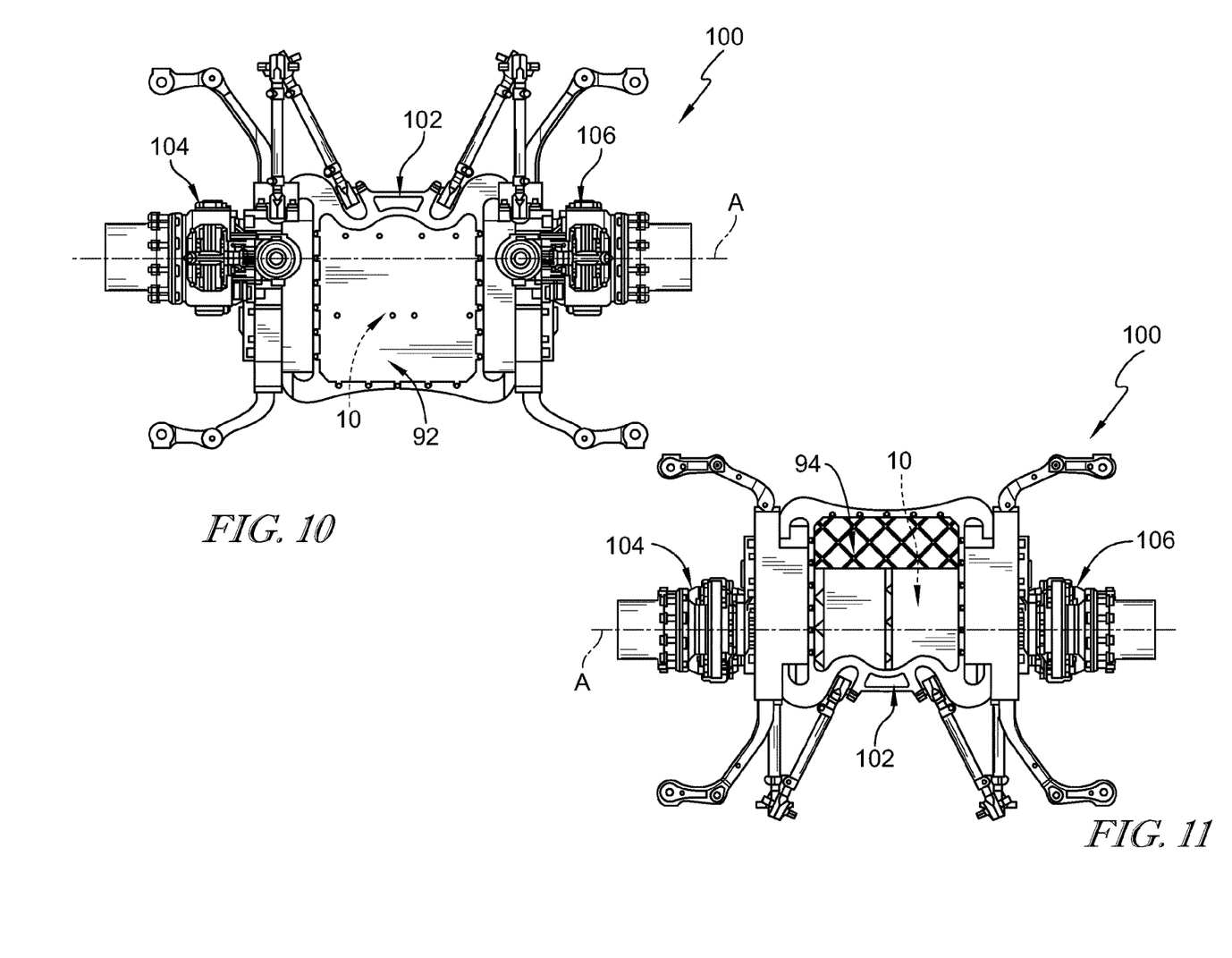
FIG. 10 is a view similar to FIG. 5 showing a top cover panel attached to the suspension frame.
FIG. 11 is a bottom plan view of the electric axle assembly of FIG. 5 showing a bottom cover panel attached to the suspension frame.

The enclosure 18 includes a side wall 32 defining a rim 34, a floor 36, and a lid 38 as shown in FIGS. 3 and 4. The lid 38 engages with a seal member 39, such as a gasket, arranged on the rim 34 to close and seal the enclosure 18 around the drive circuit 12. The enclosure 18 blocks, or otherwise restricts, undesirable material, such as water, salt, dust, and other debris found on roadways, from contacting the drive circuit 12 during operation of the electric axle assembly 100. Top and bottom cover panels 92, 94 can also be coupled to the suspension frame 102 around the drive module 10 as shown in FIGS. 10 and 11.

Figure 12:
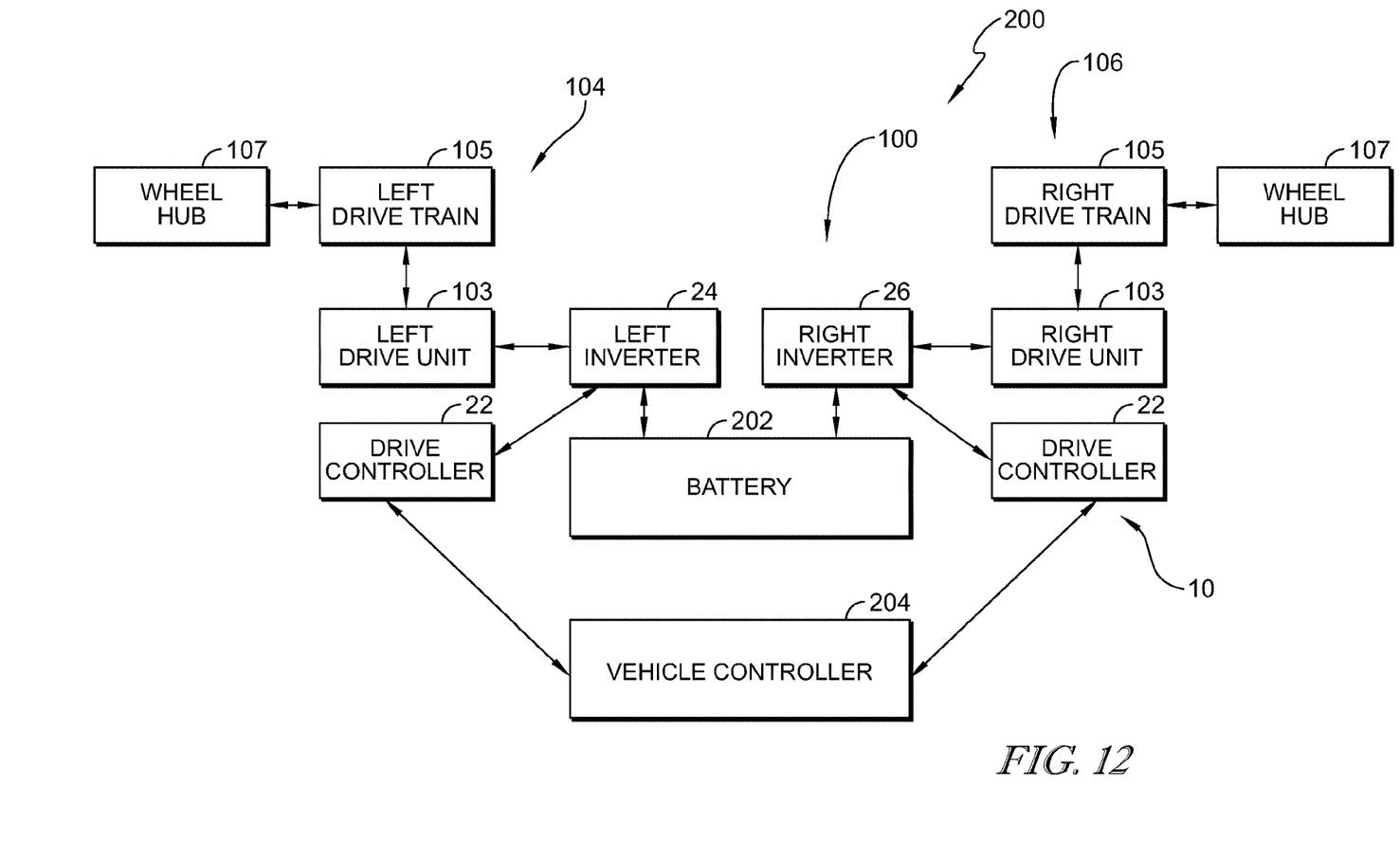
FIG. 12 is a schematic view of a vehicle in accordance with the present disclosure.

Plugs or connectors 40 are coupled to the enclosure 18 and allow the interconnects 14, 16 to communicate with the drive circuit 12 as shown in FIGS. 2 and 3. Additional interconnects 90, engaged with plugs or connectors 42, may communicate with drive circuit 12. For example, the interconnects 90 can provide for delivery of battery power, driver inputs and/or control signals, and/or cooling fluid for cooling circuit 28, among other interconnects. In some embodiments, the interconnects 90 can include an input and an output for circulation of cooling fluid through the cooling circuit 28, such as by a pump, and to a heat exchanger for removing heat from the cooling fluid. In some embodiments, cooling fluid is transferred through the drive module 10 and interconnects 14, 16 to the drive assemblies 104, 106 for cooling the drive units 103 and other components. In some embodiments, used cooling fluid is transferred back through the interconnects 14, 16 to the drive module 10. In some embodiments, used cooling fluid is removed from the drive assemblies 104, 106 by separate connections to a cooling system of the vehicle. The connectors 40, 42 allow for sealed connections of the interconnects 14, 16, 90 to the drive circuit 12 through the enclosure 18. In one illustrative embodiment, the vehicle 200 includes a battery 202 and a vehicle controller 204 as shown in FIG. 12. The vehicle controller 204 can receive driver inputs, such as demands for braking/acceleration, turning, and other driver demands, and provide signals to the drive module 10 indicative of the driver inputs. The controllers 22 selectively power the inverters 24, 26 from the battery 202 for operating the drive assemblies 104, 106 in response to the driver inputs. The interconnects 14, 16, 90 can be embodied as one or more cables, conduits, wires, or other structures for transmitting electrical power, signals, fluid, mechanical forces, or other transmissions for operating the drive module 10 and drive assemblies 104, 106 of the electric axle assembly 100.

Figures 6, 7, 8, 9:
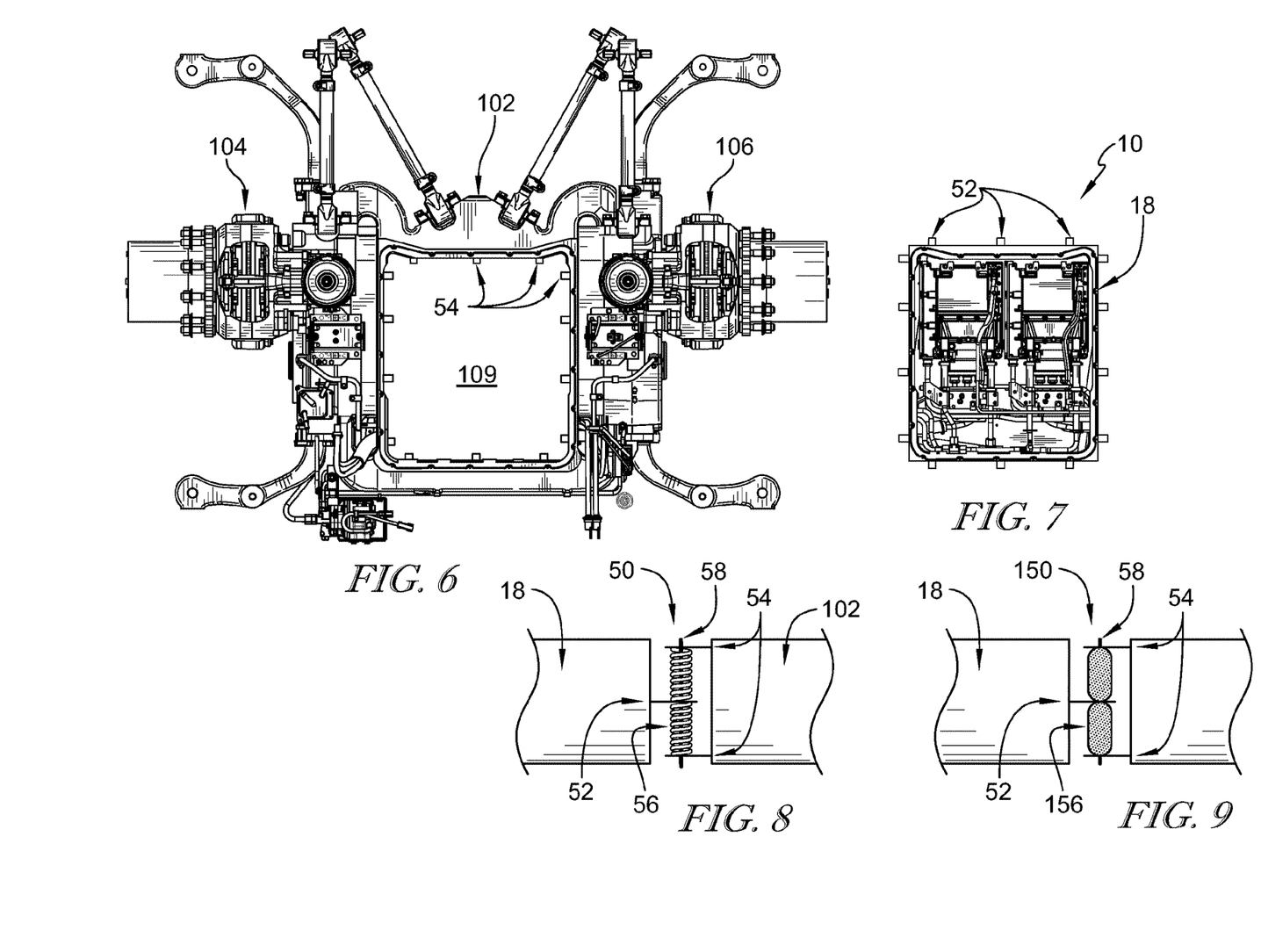
FIG. 6 is a view similar to FIG. 5 showing the drive module displaced from the suspension frame.
FIG. 7 is a top plan view of the drive module of FIG. 5.
FIG. 8 is a side elevation view of an embodiment of an isolation mount in accordance with the present disclosure for holding the drive module on the suspension frame.
FIG. 9 is a side elevation view of another embodiment of an isolation mount in accordance with the present disclosure for holding the drive module on the suspension frame.

In the illustrative embodiment, a plurality of isolation mounts 50 support the drive module 10 relative to the suspension frame 102 as shown in FIGS. 5-8. The isolation mounts 50 each include a first support tab 52 coupled to the enclosure 18 and one or more second support tabs 54 coupled to the suspension frame 102 as shown in FIG. 8. A pin 58 aligns the support tabs 52, 54 and one or more biasing members 56, such as coil springs, extend between the support tabs 52, 54 to dampen forces transferred from the suspension frame 102 to the drive module 10. For example, the biasing members 56 can be configured to bias the support tabs 52, 54 away from one another and provide space between the support tabs 52, 54 to allow relative movement. The isolation mounts 50 can dampen against road loads experienced by the suspension frame 102 as the vehicle 200 travels along a roadway. In another embodiment, isolation mounts 150 are similar to isolation mounts 50, with one difference being that pliable sleeves 156 are used in place of the biasing members 56. In some embodiments, the pliable sleeves 156 are form from resilient materials, such as rubber. Other arrangements of isolation mounts for dampening forces between the suspension frame 102 and drive module 10 are contemplated by the present disclosure. The interconnects 14, 16, 90 may also be arranged with an amount of slack with the drive module 10 received in the recess 109 to allow movement of the drive module 10 relative to the suspension frame 102 on the isolation mounts 50, 150. In some embodiments, additional isolation mounts are provided for connection of the drive circuit 12 into the enclosure 18 for further dampening.

Arrangement of the drive circuit 12 in the enclosure 18 minimizes a profile of the electric axle assembly 100 and allows for easy repair or replacement of the drive module 10 and/or components therein, such as the inverters 24, 26 of the drive circuit 12. The drive module 10 is also dampened relative to the forces placed on the suspension frame 102 during operation of the electric axle assembly 100. The drive module 10 can also be arranged and configured for used with different configurations of electric axle assemblies. For example, the integrated drive circuit 12 can be configured to control operation of drive units in different electric axle assemblies. The drive module 10 can be connected to the drive units and mounted to the frame of the vehicle to allow operation.

In illustrative embodiments, the electric axle assembly includes an integrated control system for operating the first and second drive units. The integrated control system is disposed within a portable housing or enclosure. The portable housing includes a plurality of sidewalls and an inner surface that defines an equipment compartment. The equipment compartment is sized and shaped to house components of the integrated control system including, but not limited to, the inverter assembly, controller, the vehicle controller or VMU, fluid pumps, coolers, power cabling, communication cabling, electrical and control connections, ECU, and/or terminal blocks. The equipment compartment is also configured to provide a sealed and protected environment for the components of the integrated control system. In addition, the integrated control system may include a plurality of interconnects extending from the portable housing. The interconnects can include, for example, a power cable, a cooling line, and a vehicle control cable for connecting the integrated control system to the first drive unit and/or the second drive unit. In one embodiment, only the three interconnects including the power cable, the cooling line, and the vehicle control cable are used as input to transmit power from the batteries to the drive units. In one embodiment, the portable housing includes a top lid or cover to allow an operator access to the components of the integrated control system stored within to facilitate maintenance, repair, and/or replacement of the components of the integrated control system. The lid may be coupled to the sidewalls with a hinge assembly to enable the lid to be lifted from the sidewalls to allow an operator access to the equipment compartment.

In illustrative embodiments, the integrated control system is detachable and can be located anywhere on the vehicle chassis or sold as a separate unit. By putting all the integration items into a sealed, protected suitcase enclosure, the integrated control system eases the design work of the vehicle OEM's and provides economic scale to the system procurement. Inverters, pump, coolers, cabling, interconnects, ECU, terminal blocks, etc. are all included into the suitcase enclosure. In some embodiments, only three lines are used as input to transmit power from batteries to the wheels: 1) power cable; 2) cooling line; and 3) vehicle control cable.

In illustrative embodiments, the electric axle assembly may include an inverter device coupled to each of the first and second drive units, and a controller for operating the electrical inverter device and the drive units. Each inverter device is coupled to one or more batteries for supplying electrical power to the inverter electrical inverter. Each controller is coupled to a VMU unit.

In illustrative embodiments, electric axle assemblies of the present disclosure can be used for a low-floor or ultra-low floor (no step) vehicle. The vehicle is generally a high occupancy or heavy-duty vehicle with electric (all-battery or may be a hybrid) propulsion. The electric axle assemblies allow a compact packaging for two 2-speed transmission unit, two electric motors and two wheel hub reduction gears for a low floor vehicle. Having 2-speeds in the transmission unit will allow vehicle performance improvement for top speed and motor efficiency. Integrating the electric motor on the side of the transmission unit (e.g., parallel and adjacent) helps package the system compactly. Using a set of parallel shaft gears for reduction allows an offset to package the motor. The two-speed transmission unit will be integrated within the axle housing.

In illustrative embodiments, the electric drive axle may include two motors, two 2-speed transmission units, two hub reduction gears and an external axle housing, wherein the motors are used for providing power for driving each wheel. The electric drive axle may include an electric motor with a rotor shaft driving an offset gearing reduction. The output of the offset gearing reduction will input power to a shaft with several bearings, a selectable synchronizer/clutch and two gears, which pair with two gears on the output shaft of the transmission, respectively. The synchronizer will select speeds for two ratios, which will transmit power to the output shaft with either gear pairs in the transmission. The output shaft of the transmission will couple to the input of the wheel hub planetary drive sun gear. In the wheel hub planetary drive, the ring gear will be held stationary while the planet carrier will output power to the wheels as in conventional wheel hub drives. Two electric motors, two 2-speed transmission units and two planetary wheel hub drives are on one axle. The axle housing will integrate each electric motor and transmission compactly and transmit vehicle loads to suspension components.

In illustrative embodiments, the electric axle assemblies further include suspension arms which may be used to attach the electric axle assembly to the vehicle. The vehicle may be an electric vehicle or a hybrid vehicle with an electric motor and internal combustion generator/motor. Advantageously, the suspension arms may be configured to retrofit the electric axle assembly to a vehicle. For example, a low floor bus originally equipped with a traditional axle assembly may utilize the electric axle assembly in place of the traditional axle assembly.

In illustrative embodiments, a wheel is coupled to each end of the electric axle assembly to support the vehicle and transfer motive power to a road surface. In some embodiments, the electric axle assembly is a dual wheel configuration with a pair of wheels coupled to each end of the electric axle assembly. Each wheel defines an axis of rotation. The axis of rotation of each wheel is generally aligned.

In illustrative embodiments, the electric axle assembly further includes a wheel drive assembly configured to independently drive one of the wheels or set of wheels on either side of the electric axle assembly. Each drive assembly may operate the respective wheel(s) at a different speed during a turning maneuver of the vehicle, or in response to available traction at each wheel, for example. Each wheel drive assembly includes an electric drive unit, a transmission unit, and a wheel end assembly. Axle housings integrates the electric units and transmission units compactly and transmits vehicle loads to the suspension arms. The transmission unit allows the vehicle to have an increased top speed while operating more efficiently at low speeds. The suspension frame is arranged for a height of a low floor to be both as low as possible, and a width to be as wide as possible in order to maximize capacity of the vehicle. The suspension frame can be offset from the axis of rotation of the wheels in order to decrease the height of the low floor of the vehicle. The electric axle assembly may further include a braking system for the vehicle. The braking system may include an air cylinder, brake hoses, brake drums, brake rotors, brake calipers, and the like.

In illustrative embodiments, the electric drive unit generates torque to drive the wheels. The electric drive unit includes a rotor shaft and a drive pinion fixed to the rotor shaft. The electric drive unit may be a DC or AC motor, brushed or brushless, and other types commonly known in the art. The drive units engage with the drive trains to provide motive force from the drive units to the wheels. The drive trains may include multiple, selectable reduction ratio gears to provide an advantage for the drive unit in turning the wheels. In some embodiments, a shift mechanism allows for selectively engaging gears of different ratios in the drive train. The shift mechanism may be controlled manually or automatically. The shift mechanism may be responsive to hydraulic pressure, pneumatic pressure, or electronic signals generated by a transmission control module. Alternatively, the shift mechanism may include a mechanical linkage controlled by the vehicle operator.

A controller, computing device, server or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. An electric axle assembly comprising:
a suspension frame including a recess defined therein;
a drive assembly coupled to the suspension frame, the drive assembly having an electric drive unit and a drive train housed in a case, the electric drive unit engaged with the drive train and configured to provide motive force to the drive train; and
a drive module coupled to the suspension frame and configured to control operation of the drive assembly, one or more interconnects being coupled between the drive module and the drive assembly,
wherein the drive module includes a drive circuit and an enclosure, the drive circuit is housed in the enclosure and the enclosure is sealed around the drive circuit, and wherein the enclosure of the drive module is separate from the suspension frame and shaped and sized to be selectively received in and removed from the recess defined in the suspension frame.

2. The electric axle assembly of claim 1, wherein the drive circuit includes an inverter and a controller, and wherein the controller is configured to selectively power the inverter for operation of the electric drive unit.

3. The electric axle assembly of claim 2, wherein the drive circuit further includes a cooling circuit.

4. The electric axle assembly of claim 2, wherein the enclosure includes a side wall defining a rim, a floor, and a lid, and wherein the lid is configured to engage with a seal member arranged on the rim to close the drive circuit in the enclosure and seal the enclosure around the drive circuit.

5. The electric axle assembly of claim 4, wherein the enclosure further includes sealed connectors to allow sealed connection of the interconnects to the drive module for communication with the drive circuit.

6. The electric axle assembly of claim 1, wherein the one or more interconnects are arranged for at least one of power delivery or control signal delivery.

7. The electric axle assembly of claim 6, wherein at least one of the interconnects is arranged for delivery of cooling fluid.

8. The electric axle assembly of claim 1, further comprising one or more interconnects coupled to the drive module and at least one of a battery or a vehicle controller.

9. The electric axle assembly of claim 1, wherein the suspension frame is formed to include a recess, and wherein the drive module is received in the recess.

10. The electric axle assembly of claim 9, further comprising at least one isolation mount arranged to support the drive module relative to the suspension frame, wherein the isolation mount is configured to dampen forces transferred from the suspension frame to the drive module.

11. The electric axle assembly of claim 10, wherein the isolation mount includes a support tab coupled to the drive module, a support tab coupled to the suspension frame, a pin arranged to align the support tabs, and a biasing member arranged between the support tabs and configured to bias the support tabs away from one another.

* * * * *